US012364945B2

(12) United States Patent
Wang et al.

(10) Patent No.: US 12,364,945 B2
(45) Date of Patent: Jul. 22, 2025

(54) EXHAUST GAS PURIFICATION DEVICE

(71) Applicant: ILLINOIS TOOL WORKS INC., Glenview, IL (US)

(72) Inventors: Yuwei Wang, Suzhou (CN); Yuexin Chen, Suzhou (CN)

(73) Assignee: Illinois Tool Works Inc., Glenview, IL (US)

( * ) Notice: Subject to any disclaimer, the term of this patent is extended or adjusted under 35 U.S.C. 154(b) by 765 days.

(21) Appl. No.: 17/119,743

(22) Filed: Dec. 11, 2020

(65) Prior Publication Data

US 2021/0178307 A1 Jun. 17, 2021

(30) Foreign Application Priority Data

Dec. 12, 2019 (CN) .......................... 201911273380.5

(51) Int. Cl.
*B01D 53/02* (2006.01)
*B01D 46/84* (2022.01)
(Continued)

(52) U.S. Cl.
CPC ................ *B01D 46/84* (2022.01); *B23K 3/08* (2013.01); *H05B 1/0247* (2013.01); *B01D 2279/00* (2013.01)

(58) Field of Classification Search
CPC ...... B01D 2279/00; B01D 46/54; B23K 3/08; H05B 1/0247
See application file for complete search history.

(56) References Cited

U.S. PATENT DOCUMENTS 3,831,377 A * 8/1974 Morin .................... F01N 3/043
60/309
5,976,225 A 11/1999 Nystrom
(Continued)

FOREIGN PATENT DOCUMENTS

| AU | 4412179 | 8/1979 |
| CN | 1714229 | 12/2005 |

(Continued)

OTHER PUBLICATIONS

"Organic Chemistry", by Qingjiang Liao, et. al., People's Medical Publishing House, Sep. 30, 1996, p. 1.

*Primary Examiner* — Christopher P Jones
(74) *Attorney, Agent, or Firm* — McAndrews, Held & Malloy, Ltd.

(57) ABSTRACT

The present disclosure discloses an exhaust gas purification device for purifying exhaust gas in a reflow oven hearth, the exhaust gas purification device comprising: a filtering unit; a filtering component provided in the filtering unit; a controllable gas passage that controllably communicates an interior of the filtering unit with an external environment containing oxygen, the controllable gas passage being configured to controllably introduce gas containing oxygen into the filtering unit; a heating component provided in the filtering unit, wherein the heating component is configured to be capable of heating the gas in the filtering unit to an oxidation temperature at which carbon in adherent substances on the filtering component is capable of chemically reacting to produce a gas. The exhaust gas purification device of the present disclosure has a long maintenance period, which can greatly reduce the maintenance cost.

19 Claims, 5 Drawing Sheets

(51) Int. Cl.
  *B23K 3/08*   (2006.01)
  *H05B 1/02*   (2006.01)

(56) References Cited

U.S. PATENT DOCUMENTS

| | | | |
|---|---|---|---|
| 6,027,553 A | 2/2000 | Hirano | |
| 6,233,926 B1* | 5/2001 | Bailey | F01N 3/023 60/303 |
| 2007/0137186 A1* | 6/2007 | Igarashi | F01N 3/031 60/297 |
| 2007/0277515 A1* | 12/2007 | Igarashi | F01N 3/0238 60/303 |
| 2009/0019844 A1* | 1/2009 | Hirata | F01N 3/032 60/311 |
| 2010/0307339 A1 | 12/2010 | Tadrous | |
| 2011/0232364 A1* | 9/2011 | Koizumi | B01D 46/66 73/23.33 |
| 2012/0031077 A1* | 2/2012 | Aoki | F01N 13/008 60/276 |
| 2012/0031083 A1* | 2/2012 | Minami | F01N 13/009 60/297 |
| 2013/0263737 A1 | 10/2013 | Lee | |
| 2014/0130674 A1 | 5/2014 | Holler | |
| 2017/0362977 A1* | 12/2017 | Zhang | B01D 46/84 |
| 2019/0077244 A1* | 3/2019 | Huang | B60K 6/46 |
| 2019/0211725 A1 | 7/2019 | Paukner | |
| 2019/0257528 A1 | 8/2019 | Klein | |
| 2021/0178307 A1* | 6/2021 | Wang | H05B 1/0247 |
| 2022/0169095 A1* | 6/2022 | Nilsson | B60H 1/26 |
| 2022/0258263 A1* | 8/2022 | Wang | F27B 3/045 |

FOREIGN PATENT DOCUMENTS

| | | |
|---|---|---|
| CN | 104147862 | 11/2014 |
| CN | 207861889 | 9/2018 |
| CN | 208406570 | 1/2019 |
| EP | 0358522 | 3/1990 |
| GB | 2479362 | 10/2011 |
| JP | 2004358310 | 12/2004 |
| JP | 2006192337 | 7/2006 |
| JP | 4023514 | 12/2007 |
| JP | 2015127643 | 7/2015 |
| KR | 102006385 | 8/2019 |
| WO | 2009019773 | 2/2009 |
| WO | 2016169391 | 10/2016 |

* cited by examiner

EXHAUST GAS PURIFICATION DEVICE

RELATED APPLICATIONS

The present application claims the benefit of Chinese Patent Application No. 201911273380.5, filed Dec. 12, 2019, entitled "EXHAUST GAS PURIFICATION DEVICE." The entirety of Chinese Patent Application No. 201911273380.5 is expressly incorporated herein by reference.

TECHNICAL FIELD

The present disclosure relates to an exhaust gas treatment system for a reflow oven, an in particular to an exhaust gas purification device for purifying exhaust gas in a reflow oven hearth.

BACKGROUND

During the manufacture of printed circuit boards, electronic elements are mounted on the circuit boards generally by using a process known as "reflow soldering". In a typical reflow soldering process, solder paste (e.g., tin paste) is deposited onto selected areas of a circuit board, and wires of one or more electronic elements are inserted into the deposited solder paste. The circuit board then passes through a reflow oven where the solder paste reflows in a heating zone (i.e., being heated to a melting or reflow temperature) and is then cooled in a cooling zone to electrically and mechanically connect the wires of the electronic elements to the circuit board. As used herein, the term "circuit board" includes a substrate assembly of any type of electronic elements, for example, including a wafer substrate. In the reflow oven, air or a substantially inert gas (e.g., nitrogen) is generally used as a working gas, and different working gases are used for circuit boards having different process requirements. A hearth of the reflow oven is full of the working gas, and the circuit board is soldered in the working gas while being transported through the hearth by a conveyer device.

In the reflow oven, the solder paste includes not only a solder, but also soldering flux which promotes wetting of the solder and provides a good solder joint. Other additives such as solvents and catalysts may also be included. After the solder paste is deposited on the circuit board, the circuit board is conveyed on a conveyer to pass through a plurality of heating zones of the reflow oven. The heat in the heating zones melts the soldering paste, and volatile organic compounds (VOCs) mainly including the soldering flux are vaporized into vapor, thereby forming "contaminants". The accumulation of these pollutants in the reflow oven may cause some problems. For example, if the contaminants travel to a cooling zone, they will be condensed on the circuit board and contaminate the circuit board; consequently, subsequent cleaning steps have to be performed. The pollutants may also be condensed on a surface of a cooler of the reflow oven, thereby blocking gas holes. Moreover, condensates may also drip onto subsequent circuit boards; consequently, the elements on the circuit boards may be compromised, or the contaminated circuit boards have to be cleaned in subsequent steps.

Therefore, it is necessary to discharge exhaust gas containing contaminants in a reflow oven hearth out of the hearth, in order to keep a clean working atmosphere in the reflow oven hearth, so that the contaminants are prevented from entering a cooling zone of the reflow oven and causing the above-mentioned problems in the reflow oven.

Generally speaking, the exhaust gas containing contaminants needs to be purified by an exhaust gas purification device to remove the contaminants therein, and then can be discharged into the external atmosphere or conveyed back to the reflow oven hearth. However, these contaminants will remain in the exhaust gas purification device and affect the purification efficiency of the exhaust gas purification device. Therefore, there is a need for regular maintenance and cleaning of the exhaust gas purification device.

SUMMARY OF THE DISCLOSURE

In order to solve at least one of the above-mentioned problems, the present disclosure provides an exhaust gas purification device for purifying exhaust gas in a reflow oven hearth. The exhaust gas purification device can not only facilitate maintenance and cleaning, but can also prolong the maintenance interval.

In order to achieve the above objective, a first aspect of the present disclosure provides an exhaust gas purification device for purifying exhaust gas in a reflow oven hearth, the exhaust gas purification device comprising: a filtering unit; a filtering component provided in the filtering unit; a controllable gas passage that controllably communicates an interior of the filtering unit with an external environment containing oxygen, the controllable gas passage being configured to controllably introduce gas containing oxygen into the filtering unit; a heating component provided in the filtering unit, wherein the heating component is configured to be capable of heating the gas in the filtering unit to an oxidation temperature at which carbon in adherent substances on the filtering component is capable of chemically reacting to produce a gas.

According to the first aspect described above, the exhaust gas purification device has an exhaust gas inlet and a purified gas outlet, an upstream side of the filtering component is in fluid communication with the exhaust gas inlet, and a downstream side of the filtering component is in communication with the purified gas outlet; wherein the heating component is disposed on the upstream side of the filtering component.

According to the first aspect described above, the heating component is further configured to be capable of heating the gas in the filtering unit to a self-cleaning temperature at which a soldering flux in the adherent substances on the filtering component is capable of being physically changed into liquid or gas.

According to the first aspect described above, the exhaust gas purification device has a self-cleaning mode and a maintenance mode; in the self-cleaning mode, the controllable gas passage is closed, the heating component heats the gas in the filtering unit to the self-cleaning temperature, such that the soldering flux in the adherent substances on the filtering component is physically changed into a liquid or a gas, and carbon is generated in the attachments; and in the maintenance mode, the controllable gas passage is opened, and the heating component heats the gas in the filtering unit to the oxidation temperature, such that the carbon in the adherent substances on the filtering component chemically react to produce a gas.

According to the first aspect described above, the exhaust gas purification device further has an exhaust gas purification mode; in the exhaust gas purification mode, the controllable gas passage is closed, the exhaust gas in the reflow oven hearth is filtered through the filtering component, and during the filtering, adherent substances including soldering flux deposit on the filtering component.

According to the first aspect described above, the controllable gas passage is configured such that an outlet of the controllable gas passage is close to the filtering component.

According to the first aspect described above, after the carbon in the adherent substances on the filtering component chemically react to produce a gas, the exhaust gas purification device is cleaned by a mechanical device.

According to the first aspect described above, the exhaust gas purification device further comprises a control device, which is capable of controlling a heating temperature of the heating component, such that the heating component is capable of heating the gas in the filtering unit to the oxidation temperature or the self-cleaning temperature.

According to the first aspect described above, the oxidation temperature is higher than the self-cleaning temperature.

According to the first aspect described above, the oxidation temperature is 400~450° C.

According to the first aspect described above, the self-cleaning temperature is 150~170° C.

According to the first aspect described above, at the oxidation temperature, a portion of an organic matter in the adherent substances on the filtering component is also capable of chemically reacting to produce a gas.

The concept, specific structure and resulting technical effect of the present disclosure are further described below in conjunction with the drawings to fully understand the object, features and effects of the present disclosure.

DETAILED DESCRIPTION OF EMBODIMENTS

Specific embodiments of the present disclosure are described below with reference to the accompanying drawings which constitute part of this description. It should be understood that although the terms, such as "front", "rear", "upper", "lower", "left", "right", "top", "bottom" and "side", indicating orientations are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are only illustrative and should not be considered as limitations.

It should be understood by those skilled in the art that exhaust gas or gas described in an embodiment of the present disclosure means the exhaust gas or gas principally constituted by gaseous ingredient, and it may also partially contain a mist-like or granular ingredient.

Figure 1A:
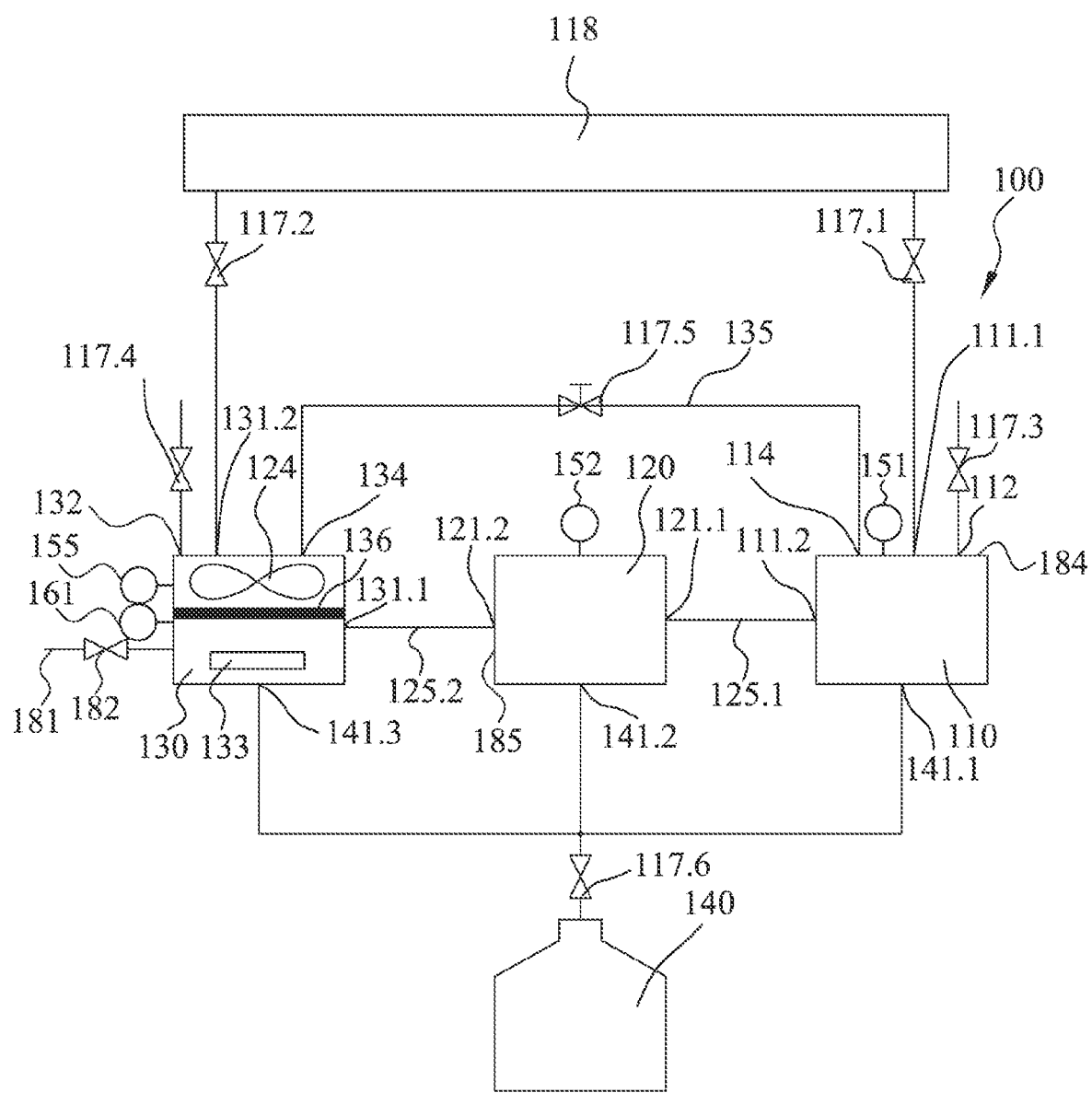
FIG. 1A is a simplified structural block diagram of an exhaust gas purification device according to an embodiment of the present disclosure.

FIG. 1A shows a simplified structural block diagram of an exhaust gas purification device according to an embodiment of the present disclosure, for showing the connection relationships between various parts of the exhaust gas purification device 100. As shown in FIG. 1A, the exhaust gas purification device 100 is disposed outside a hearth 118 of the reflow oven and is connected to the hearth 118 of the reflow oven. When the reflow oven uses a substantially inert gas, e.g. nitrogen, as a working gas, the exhaust gas purification device 100 receives exhaust gas discharged from the hearth 118 of the reflow oven and conveys the purified gas back to the hearth 118. When the reflow oven uses air as a working gas, the exhaust gas purification device 100 receives exhaust gas discharged from the hearth 118 of the reflow oven, and the purified gas may be conveyed back to the hearth 118, or may be discharged to the outside of the hearth 118 instead of being conveyed back to the hearth 118. As shown in FIG. 1A, the exhaust gas purification device 100 conveys the purified gas back to the hearth 118.

As shown in FIG. 1A, the exhaust gas purification device 100 comprises a first stage cooling unit 110, a second stage cooling unit 120, and a filtering unit 130, which are connected in sequence and are connected to the hearth 118. The first stage cooling unit 110 and the second stage cooling unit 120 are used to cool gas therein to a certain temperature, the filtering unit is used to filter the gas such that a part of the substance in the gas is adhered to a filtering component, and the first stage cooling unit 110, the second stage cooling unit 120 and the filtering unit 130 are connected via pipelines. The exhaust gas purification device may work in an exhaust gas purification mode and in a self-cleaning mode and may be subjected to maintenance in a maintenance mode by controlling a gas flow path in the exhaust gas purification device. A control device (see FIG. 2) controls the exhaust gas purification device 100 to switch between the exhaust gas purification mode, the self-cleaning mode, and the maintenance mode. In the exhaust gas purification mode, the exhaust gas purification device 100 may purify the exhaust gas discharged from the hearth 118 and convey the purified gas back to the hearth 118. In the self-cleaning mode, the exhaust gas purification device 100 may perform self-cleaning on the first stage cooling unit 110, the second stage cooling unit 120, the filtering unit 130 and passages communicated therebetween. In the maintenance mode, the exhaust gas purification device 100 may remove carbon and some organic matters deposited in the filtering unit 130, to facilitate the subsequent complete disassembling of the exhaust gas purification device 100 for further cleaning.

Specifically, the first stage cooling unit 110 is provided with an exhaust gas inlet 111.1, a self-cleaning gas inlet 114, a gas outlet 111.2, and a first waste liquid outlet 141.1, and the second stage cooling unit 120 is provided with a gas inlet 121.1, a gas outlet 121.2, and a waste liquid outlet 141.2, wherein the exhaust gas inlet 111.1 and the self-cleaning gas inlet 114 are connected to an inlet side 184 of the first stage cooling unit 110, and the gas outlet 121.2 is connected to an outlet side 185 of the second stage cooling unit 120. The filtering unit 130 is provided with a gas inlet 131.1, a self-cleaning gas outlet 134, a purified gas outlet 131.2, and a waste liquid outlet 141.3.

The exhaust gas inlet 111.1 of the first stage cooling unit 110 is in controllable fluid communication with a high-temperature zone of the hearth 118 via a valve component 117.1. The gas outlet 111.2 of the first stage cooling unit 110 is in fluid communication with the gas inlet 121.1 of the second stage cooling unit 120 via a connecting passage 125.1. The gas outlet 121.2 of the second stage cooling unit 120 is in fluid communication with the gas inlet 131.1 of the filtering unit 130 via a connecting passage 125.2, and the purified gas outlet 131.2 of the filtering unit 130 is in controllable fluid communication with a low-temperature zone of the hearth 118 via a valve component 117.2. In this way, the exhaust gas discharged from the hearth 118 can be purified by passing through the first stage cooling unit 110, the second stage cooling unit 120, and the filtering unit 130 in sequence and then returns to the hearth 118.

In addition, the self-cleaning gas outlet 134 of the filtering unit 130 is connected to the gas inlet 114 of the first stage cooling unit 110 via a connecting passage 135, and a passage switching component 117.5 is disposed on the connecting passage 135 to controllably and fluidly communicate the self-cleaning gas outlet 134 of the filtering unit 130 with the gas inlet 114 of the first stage cooling unit 110. In this way, the gas discharged from the self-cleaning gas outlet 134 of the filtering unit 130 can enter the first stage cooling unit 110, and can flow through the first stage cooling unit 110 and the second stage cooling unit 120 in sequence, and then return to the filtering unit 130, thereby creating a self-cleaning gas circulation in the exhaust gas purification device 100.

According to an embodiment of the present disclosure, on the first stage cooling unit 110, instead of disposing the self-cleaning gas inlet 114 that is separate from the exhaust gas inlet 111.1, one inlet may be disposed as both the exhaust gas inlet and the self-cleaning gas inlet. Likewise, on the filtering unit 130, instead of disposing the self-cleaning gas outlet 134 that is separate from the purified gas outlet 131.2, one outlet may also be disposed as both the self-cleaning gas outlet 134 and the purified gas outlet 131.2.

The exhaust gas purification device 100 further comprises a gas replenishing port 112 disposed on the first stage cooling unit 110, a gas discharge port 132 disposed on the filtering unit 130, and a gas concentration detection component for detecting a gas concentration in the filtering unit 130. As an example, the gas concentration detection component is an oxygen concentration detection component 155, which obtains a concentration of a working gas by detecting an oxygen concentration. The oxygen concentration detection component 155 is disposed near the gas discharge port 132. The gas replenishing port 112 is controllably opened and closed by means of a valve component 117.3, and the gas discharge port 132 is controllably opened and closed by means of a valve component 117.4. When the reflow oven uses a substantially inert gas (e.g., nitrogen) as a working gas, the working gas, namely, the substantially inert gas (e.g., nitrogen) may be replenished through the gas replenishing port 112 to the exhaust gas purification device 100, and the gas discharge port 132 is configured to cooperate with the gas replenishing port 112 when the gas replenishing port 112 is working. By providing the gas replenishing port 112 and the gas discharge port 132, the concentration of the working gas in the exhaust gas purification device 100 may be adjusted to match the concentration of the working gas in the hearth 118. The gas replenishing port 112 may be in controllable fluid communication with a working gas source, namely, a substantially inert gas (e.g., nitrogen) via the valve component 117.3, and the gas discharge port 132 is in controllable fluid communication with the atmosphere via the valve component 117.4.

A filtering component 136 is disposed in the filtering unit 130. The gas inlet 131.1 of the filtering unit 130 is disposed on an upstream side of the filtering component 136, and the self-cleaning gas outlet 134 and the purified gas outlet 131.2 are disposed on a downstream side of the filtering component 136. It should be noted that "upstream" and "downstream" here are described with respect to a gas flowing direction in the exhaust gas purification device 100. The filtering component 136 may be a steel ball filter screen, a paper filter screen, etc.

A heating component 133 is further disposed in the filtering unit 130, and the heating component 133 is located below the filtering component 136 and is configured to heat the filtering component 136. In the exhaust gas purification mode, the heating component 133 does not perform heating. In the self-cleaning mode, the heating component 133 can heat the gas in the filtering unit 130 to a self-cleaning temperature, such that the contaminants, including soldering flux, adhered to the filtering component 136 are physically changed into a liquid or a gas. In the maintenance mode, the heating component 133 can heat the gas in the filtering unit 130 to an oxidation temperature, such that the carbon adhered to the filtering component 136 undergoes a chemical reaction (such as an oxidation reaction) to produce a gas. At this temperature, other organic matters adhered to the filtering component 136 will also chemically react to produce a gas. The heating component 133 may heat the gas in the filtering unit 130 to the self-cleaning temperature or the oxidation temperature by controlling the heating temperature of the heating component 133. As a specific example, the self-cleaning temperature may be about 150~170° C., and the oxidation temperature may be about 400~450° C. When the heating temperature of the heating component 133 is about 400° C., the gas in the filtering unit 130 may be heated to the self-cleaning temperature; and when the heating temperature of the heating component 133 is about 700° C., the gas in the filtering unit 130 may be heated to the oxidation temperature. It should be noted that the self-cleaning temperature and the oxidation temperature may also be set to other specific temperatures, as long as the above functions can be satisfied. Those skilled in the art should understand that, according to the different specific configurations of the filtering unit 130, such as the size of the filtering unit 130 and the separation distance between the filtering component 136 and the heating component 133, the heating component 133 may also be set to have different heating temperatures to heat the gas in the filtering unit to the self-cleaning temperature and the oxidation temperature.

The exhaust gas purification device 100 further comprises a controllable gas passage 181, and the controllable gas passage 181 is connected to the filtering unit 130 via a valve component 182. The valve member 182 is opened only when the exhaust gas purification device 100 is in the maintenance mode, and is used to controllably introduce a gas containing oxygen into the filtering unit 130. As an example, an outlet of the gas passage 181 is disposed close to the filtering component 136. An inlet of the controllable gas passage 181 is directly connected to the atmosphere, or connected to a gas source, such as an oxygen cylinder, which is capable of supplying oxygen.

It should be noted that "close to" here means that the outlet of the controllable gas passage 181 is not far away from the filtering component 136, or the outlet of the controllable gas passage 181 is in direct fluid communication with the filtering component 136. Therefore, it is possible to facilitate the chemical reaction between the oxygen introduced into the filtering unit 130 from the outlet of the controllable gas passage 181 and the carbon and some organic matters deposited on the filtering component 136.

The exhaust gas purification device 100 further comprises a fan 124 configured to drive gas flow in the exhaust gas purification device 100. In the embodiment shown in FIG.

1A, the fan 124 is disposed in the filtering unit 130. Specifically, the fan 124 is disposed on the downstream side of the filtering component 136, an air inlet side of the fan 124 is in fluid communication with a cavity in the filtering unit 130, and an air outlet side of the fan 124 is in fluid communication with the purified gas outlet 131.2, the self-cleaning gas outlet 134, and the gas discharge port 132 of the filtering unit 130. In another embodiment, another fluid power supplying device (such as an air blower and a pump) may also be used to replace the fan 124 in the embodiment shown in FIG. 1A, as long as the gas in the exhaust gas purification device 100 can be driven to flow according to an expected path.

The exhaust gas purification device 100 further comprises a collecting unit 140. The waste liquid outlet 141.1 of the first stage cooling unit 110, the waste liquid outlet 141.2 of the second stage cooling unit 120, and the waste liquid outlet 141.3 of the filtering unit 130 are all in communication with the collecting unit 140, so that the liquid discharged from the first stage cooling unit 110, the second stage cooling unit 120, and the filtering unit 130 can flow into the collecting unit 140. A valve component 117.6 is disposed at an inlet of the collecting unit 140. When the collecting unit 140 needs to be replaced or the fluid in the collecting unit 140 needs to be discharged, the valve component 117.6 may be closed to disconnect the collecting unit 140 from the first stage cooling unit 110, the second stage cooling unit 120, and the filtering unit 130.

The exhaust gas purification device 100 further comprises temperature detection components 151, 152 configured to respectively detect the temperatures of the gases in the first stage cooling unit 110 and the second stage cooling unit 120, and a temperature detection component 161 for detecting the temperature of the gas in the filtering unit 130.

It should be noted that, in the embodiment shown in FIG. 1A, the exhaust gas purification device 100 comprises two stages of cooling units, the two stages of cooling units being in fluid communication via the connecting passage 125.1. In other embodiments, the exhaust gas purification device may also comprise only one cooling unit, as long as the upstream side of the filtering unit is in fluid communication with an outlet side of the cooling unit, and the downstream side of the filtering unit is in fluid communication with an inlet side of the cooling unit.

As described above, the exhaust gas purification device 100 has an exhaust gas purification mode, a self-cleaning mode, and a maintenance mode. In the exhaust gas purification mode, the exhaust gas purification device 100 purifies the gas discharged from the hearth 118 of the reflow oven. In the self-cleaning mode, the exhaust gas purification device 100 performs the self-cleaning on the various units and connecting pipelines inside the exhaust gas purification device 100. In the maintenance mode, the exhaust gas purification device 100 no longer receives the gas discharged from the hearth 118 of the reflow oven, but makes the carbon and some organic matters in the adherent substances of the filtering component 136 undergo an oxidation reaction, so as to facilitate subsequent disassembling of the exhaust gas purification device 100 for further cleaned by a mechanical device. By controlling the opening and closing of the respective valve components 117.1, 117.2, 117.3, 117.4, 117.5, 117.6, 182, the exhaust gas purification device 100 can be switched between the three modes, that is, the exhaust gas purification mode, the self-cleaning mode, and the maintenance mode. Gas flow paths in the three working modes of the exhaust gas purification device 100 of the present disclosure will be described below by taking a reflow oven that uses a substantially inert gas (e.g., nitrogen) as a working gas, as an example.

Figure 1B:
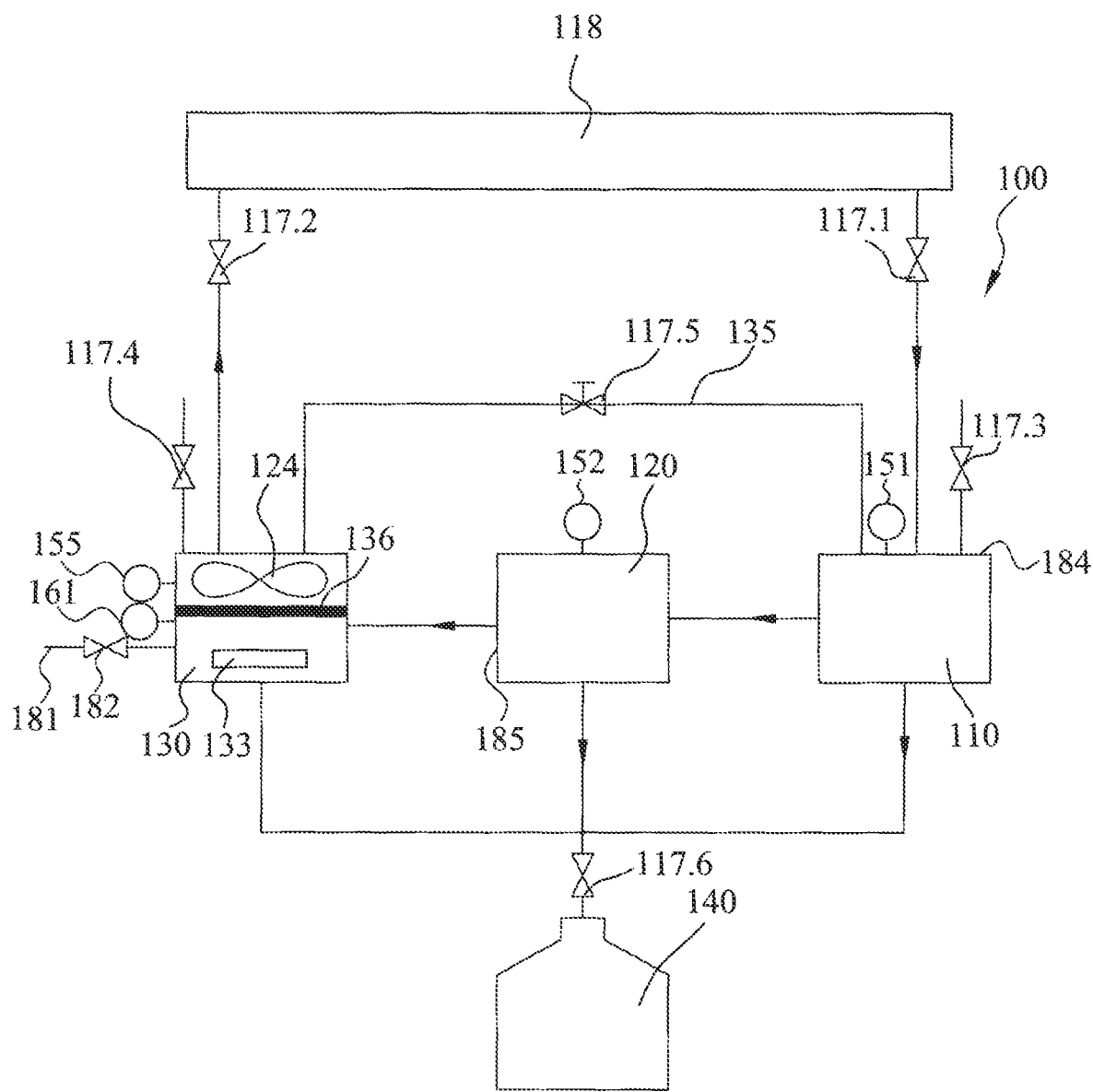
FIG. 1B is a block diagram showing a gas flow path when the exhaust gas purification device in FIG. 1A is in an exhaust gas purification mode.

FIG. 1B shows a gas flow path when the exhaust gas purification device 100 shown in FIG. 1A is in an exhaust gas purification mode. As shown in FIG. 1B, when the exhaust gas purification device 100 is in the exhaust gas purification mode, the valve components 117.1, 117.2, 117.6 are open, the valve component 117.3 and the valve component 117.4 are closed, the passage switching component 117.5 may be closed or at least partially opened, and the valve component 182 is closed to close the gas passage 181. Exhaust gas (having a temperature of about 170° C.) containing contaminants in the hearth 118 of the reflow oven, after being discharged from a high-temperature zone of the hearth 118, firstly passes through the first stage cooling unit 110 and is cooled to a first temperature of 110~130° C., for example. At this temperature, organic soldering fluxes such as rosin in the contaminants of the exhaust gas in the first stage cooling unit 110 are condensed from a gaseous phase into liquid phase and may enter the collecting unit 140 through the waste liquid outlet 141.1 of the first stage cooling unit 110, and the remaining exhaust gas is then conveyed to the second stage cooling unit 120 for further cooling. The gas that has entered the second stage cooling unit 120 is cooled in the second stage cooling unit 120 to a second temperature of 60~80° C., for example, such that other contaminant organic substances (for example, low-condensation-point acidic or ester or ether organic substances) in the exhaust gas are condensed from a gaseous phase into liquid phase and enter the collecting unit 140 through the waste liquid outlet 141.2 of the second stage cooling unit 120, and the remaining exhaust gas is conveyed to the filtering unit 130 for filtration and purification. After the exhaust gas entering the filtering unit 130 is filtered, it becomes purified gas, wherein the granular and mist-like organic matters are adhered to the filtering component 136. Finally, the purified gas is conveyed back to a low-temperature zone of the hearth 118 of the reflow oven, thereby completing the purification of the exhaust gas.

When the exhaust gas purification device 100 is in the exhaust gas purification mode, if the valve component 117.5 is closed, the purified gas filtered by the filtering unit 130 cannot return to the first stage cooling unit 110 through the connecting passage 135. If the passage switching component 117.5 is open or partially open, part of the purified gas filtered by the filtering unit 130 can return to the first stage cooling unit 110 through the connecting passage 135. In this way, the gas in the first stage cooling unit 110 may be cooled by the purified gas having a lower temperature in the filtering unit 130, thereby saving a cooling medium used for the heat exchange in the first stage cooling unit 110.

Figure 1C:
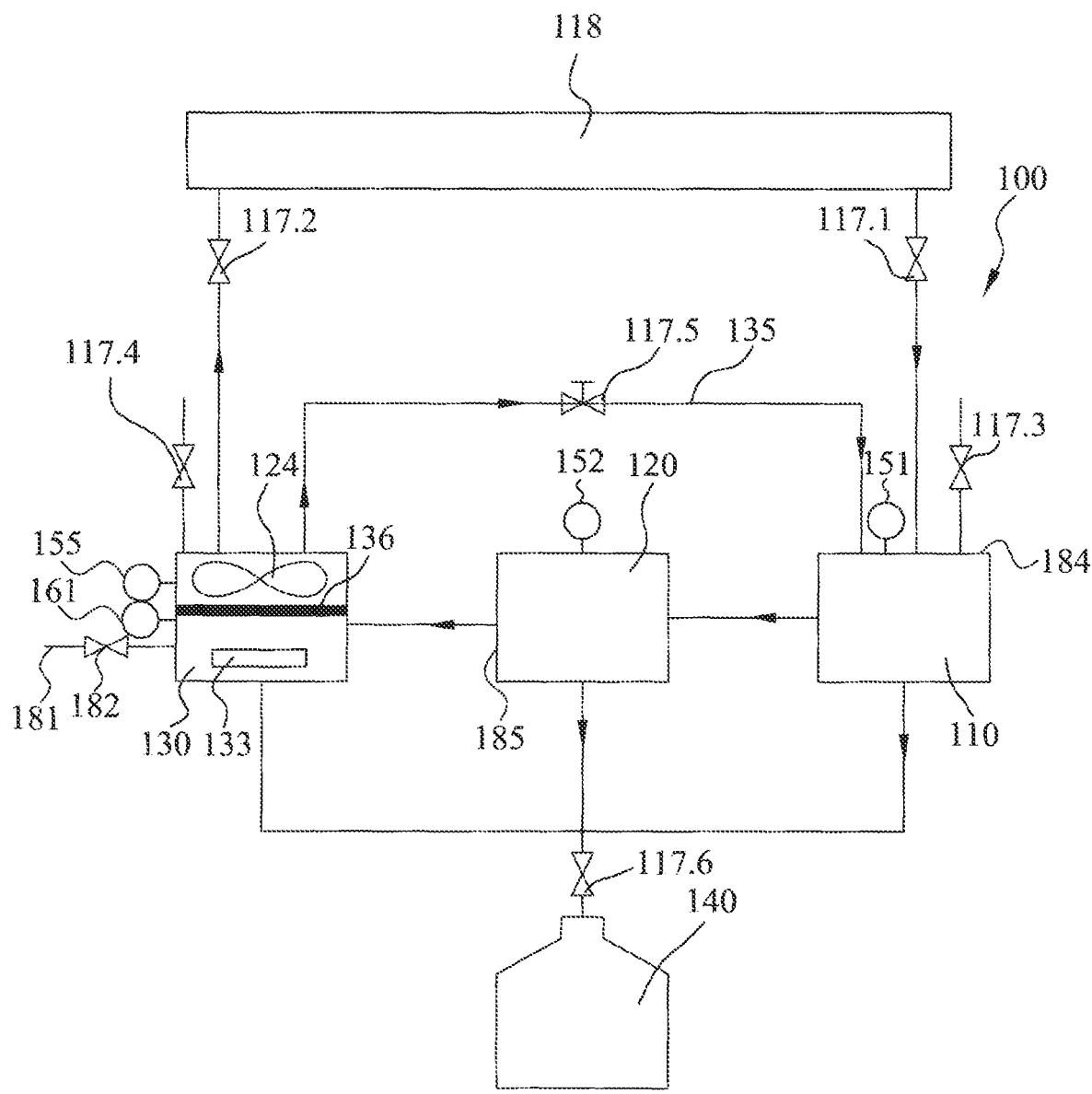
FIG. 1C is a block diagram showing a gas flow path when the exhaust gas purification device in FIG. 1A is in a self-cleaning mode.

FIG. 1C shows a gas flow path when the exhaust gas purification device 100 is in the self-cleaning mode. As shown in FIG. 1C, when the exhaust gas purification device 100 is in the self-cleaning mode, the valve components 117.3, 117.4 are closed, the valve component 117.6 and the passage switching component 117.5 are opened, the valve component 182 is closed to close the gas passage 181, and the valve components 117.1, 117.2 may be opened or closed. The state in which the valve components 117.1, 117.2 are open is shown in the figure. In this case, the control device (see FIG. 2) controls the heating temperature of the heating component 133 in the filtering unit 130, for example, to raise the temperature of the heating component 133 to about 400° C., so as to heat the gas in the filtering unit 130 and raise the temperature of the gas inside the filtering unit 130 to about 150° C. to 170° C., for example. At this temperature, a part of the solid contaminants (e.g., soldering flux) adhered to the filtering component 136 is physically changed to convert into liquid, and another part is converted into gas, wherein the liquid can be discharged through the waste liquid outlet 141.3 of the filtering unit 130, while the gas, at a higher temperature, is conveyed to the first stage cooling unit 110 and the second stage cooling unit 120 through the connecting passage 135. As like the above exhaust gas purification process, the gases in the first stage cooling unit 110 and the second stage cooling unit 120 flow back to the filtering unit 130 through the connecting passages 125.1, 125.2, such that the solid contaminant organic substances adhered to the components in the first stage cooling unit 110 and the second stage cooling unit 120 and to inner walls of the connecting passage 125.1 and the cooling passage 125.2 are heated again into liquid or gas, and the liquid is discharged through the waste liquid outlet 141.1 of the first stage cooling unit 110 and the waste liquid outlet 141.2 of the second stage cooling unit 120, while the gas is conveyed back to the filtering unit 130 to comple a self-cleaning gas cycle. In this self-cleaning gas cycle, the filtering component 136 has a higher local temperature at a section close to the heating component 133, such that a part of the adherent substances on the filtering component 136 will undergo a carbonization reaction to obtain a carbonized product. The carbonized product comprises carbon and some small-molecule organic matters.

In the self-cleaning gas cycle shown in FIG. 1C, if the valve components 117.1 and 117.2 are closed, the exhaust gas in the hearth of the reflow oven cannot enter and exit the exhaust gas purification device 100, and the exhaust gas purification device 100 can perform internal self-cleaning in a relatively independent internal circulation process. If the valve components 117.1 and 117.2 are opened, the exhaust gas in the hearth of the reflow oven can still enter and exit the exhaust gas purification device 100. During the internal self-cleaning process of the exhaust gas purification device 100, the exhaust gas in the hearth of the reflow oven may also be subjected to the exhaust gas purification process as shown in FIG. 1B. Therefore, whether the valve components 117.1 and 117.2 are closed or opened does not affect the operation of the reflow oven. In other words, even if the reflow oven is in operation, the exhaust gas purification device 100 can be in the self-cleaning mode to perform self-clean operation therein. According to the actual production requirements, the exhaust gas purification device 100 can be controlled to enter the self-cleaning mode at a certain interval of time, and the exhaust gas purification device 100 can be cleaned to some extent without affecting the operation of the reflow oven.

Figure 1D:
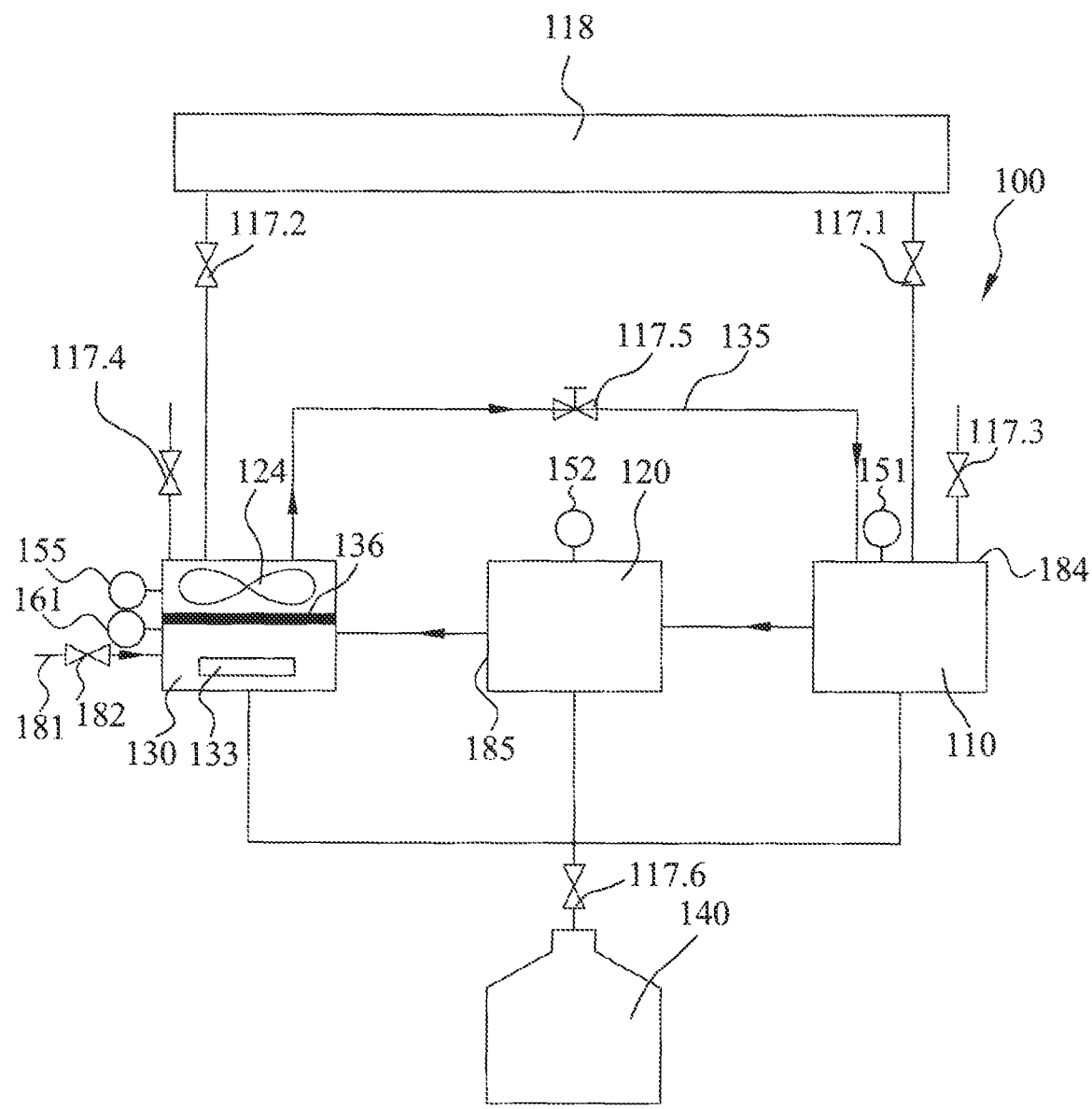
FIG. 1D is a block diagram showing a gas flow path when the exhaust gas purification device in FIG. 1A is in a maintenance mode.

FIG. 1D shows a gas flow path when the exhaust gas purification device 100 is in the maintenance mode. As shown in FIG. 1D, when the exhaust gas purification device 100 is in the maintenance mode, the valve components 117.1, 117.2, 117.3, 117.4, 117.6 are closed, the passage switching component 117.5 is opened, and the valve component 182 is opened to open the gas passage 181. In this case, the heating component 133 in the filtering unit 130 may be heated, for example, to about 700° C., to heat the gas in the filtering unit 130, and raise the temperature of the gas inside the filtering unit 130 to about 400° C. to 450° C., for example. At this temperature, the carbon in the carbonized product deposited on the filtering component 136 can undergo an oxidation reaction with the oxygen introduced in the gas channel 181, so that the carbon becomes a gas. Also at this temperature, the small-molecule organic matters in the carbonized product deposited on the filtering component 136 and a part of the soldering flux contaminants may also undergo an oxidation reaction with the oxygen to produce a gas, thereby reducing the amount of organic matters adhered to the filtering component 136. These gases are conveyed to the first stage cooling unit 110 and the second stage cooling unit 120 through the connecting channel 135. The gases in the first stage cooling unit 110 and the second stage cooling unit 110 flow back to the filtering unit 130 through the connecting passages 125.1, 125.2 according to the above mentioned self-cleaning gas circulation process. The control device (see FIG. 2) controls the heating component 133 to continue heating for a period of time and then stop heating. After the gas in the exhaust gas purification device 100 is cooled to the normal temperature, the exhaust gas purification device 100 may be disassembled, and the exhaust gas purification device 100 may be completely cleaned by a mechanical device by means of ultrasonic cleaning, etc. The desired continuous heating time of the heating component 133 is related to the size of the exhaust gas purification device 100 and the amount of carbon deposited on the filtering component 136, and may be preset by those skilled in the art as required.

After observation and analysis, the inventor found that during the self-cleaning gas circulation process, the heating component 133 needs to heat the gas in the filtering unit 130 to the self-cleaning temperature, such that the soldering flux and other contaminants in the adherent substances on the filtering component 136 are physically changed. However, during this process, a local carbonization reaction may also occur on the filtering component 136 to produce the carbonized product including carbon in the adherent substances. The accumulated carbon and other adherent substances including soldering flux remaining on the filtering component 136 may cause the filtering component 136 to be blocked to some extent, which on one hand leads to a poor gas circulation in the exhaust gas purification device 100, and on the other hand prevents the temperature of the gas in the cooling unit of the exhaust gas purification device 100 from reaching the expected temperature, thereby affecting the exhaust gas purification and self-cleaning effects of the exhaust gas purification device 100, and also affecting the soldering effect of the reflow oven.

In addition, after observation and analysis, the inventor found that as the contaminants in the exhaust gas purification device 100 continue to accumulate after a period of use, the entire exhaust gas purification device 100 needs to be cleaned. In order to achieve mechanized operation, a machine device is often used for cleaning. For example, a vibration-type machine device is used to clean the various components of the exhaust gas purification device 100 in a solvent. However, when the carbon is adhered to the filtering component 136, the cleaning effect of the machine device may not meet the cleaning requirements due to the poor solubility of the carbon, and thus manual cleaning may be also needed.

However, in the exhaust gas purification device 100 of the present disclosure, after the self-cleaning mode, the oxygen is first introduced into the filtering unit 130, and the heating component 133 is used to perform a high-temperature treatment on the carbon deposited on the filtering component 136, such that the carbon chemically reacts with the introduced oxygen to remove the carbon from the adherent substances on the filtering component 136. In addition, during this process, some of the other organic matters (including soldering flux and some small-molecule organic matters, etc.) adhered to the filtering component 136 will also undergo an oxidation reaction to produce a gas. Then, an operator can continue to clean the exhaust gas purification device 100 in a mechanized manner, for example, using an ultrasonic machine device to perform subsequent cleaning of the remaining organic matters in the exhaust gas purification device, which reduces the difficulty of the cleaning, and can also reduce the amount of solvent used in the cleaning process to some extent.

It thus can be seen that, by controlling the heating component 133 to heat to different heating temperatures, the heating component 133 not only may heat the gas in the filtering unit 130 to the self-cleaning temperature in the self-cleaning mode such that the soldering flux and other contaminants in the adherent substances on the filtering component 136 are physically changed, but also may heat the gas in the filtering unit 130 to the oxidation temperature in the maintenance mode such that the carbon deposited on the filtering component 136 undergoes a chemical reaction.

In the present disclosure, the gas in the filtering unit 130 is heated to different temperatures by controlling the controllable gas passage 181, the various valve components and the switching component, and by using different heating temperatures for the same heating component 133, thereby achieving three working modes for one exhaust gas purification device 100. Moreover, since the exhaust gas purification device 100 of the present disclosure does not need to shut down the reflow oven in the self-cleaning mode, the combination of the self-cleaning mode and the maintenance mode can prolong the period until the reflow oven needs to be shut down for maintenance.

As an exemplary technical effect, the period of the self-cleaning mode of the exhaust gas purification device 100 of the present disclosure may be about once a week, and the period of the maintenance mode may be about once a month. It can be seen that the exhaust gas purification device 100 of the present disclosure has a longer maintenance period, which can greatly reduce the maintenance cost.

When the hearth 118 of the reflow oven uses a substantially inert gas (e.g., nitrogen) as a working gas, a concentration of the working gas should be kept within a certain range in order to meet process requirements. A unit (e.g., a unit for replenishing the working gas) for regulating the concentration of the working gas in the hearth 118 is generally disposed in the reflow oven. When the exhaust gas purification device 100 is in the exhaust gas purification mode, the gas in the hearth 118 of the reflow oven is continuously purified by the exhaust gas purification device 100 and is re-conveyed back to the hearth 118 of the reflow oven. Therefore, the working gas in the exhaust gas purification device 100 that is in the exhaust gas purification mode has a concentration close to that in the unit for regulating the concentration of the working gas in the hearth 118 of the reflow oven. However, after the exhaust gas purification device 100 goes through the maintenance mode and is disassembled for cleaning, the working gas in the exhaust gas purification device 100 has a concentration lower than the concentration of the working gas in the hearth 118. Therefore, according to the present disclosure, after the maintenance mode and the cleaning of the exhaust gas purification device 100 are completed, a certain amount of working gas may be replenished to the exhaust gas purification device 100 before the exhaust gas purification device 100 is re-communicated to the hearth 118 of the reflow oven, such that the working gas in the exhaust gas purification device 100 reaches a concentration that is the same as or close to the concentration of the working gas in the reflow oven. For this purpose, the working gas is replenished through the gas replenishing port 112 to the exhaust gas purification device 100 and, at the same time, the gas in the exhaust gas purification device 100 is discharged through the gas discharge port 132, until it is determined, by the oxygen concentration detection component 155, that the protective gas in the exhaust gas purification device 100 has reached the concentration of the protective gas in the reflow oven.

When the exhaust gas purification device 100 is used in a reflow oven that uses air as the working gas, gas purified by the exhaust gas purification device 100 may be conveyed back to the hearth 118 or, may be directly discharged into the atmosphere instead of being conveyed back to the hearth 118. If the gas purified by the exhaust gas purification device 100 is directly discharged into the atmosphere, the purified gas outlet 131.2 of the filtering unit 130 shown in FIG. 1B is in controllable fluid communication with the atmosphere via the valve component 117.2, instead of being connected to the hearth 118.

According to the present disclosure, the first stage cooling unit 110 and the second stage cooling unit 120 in the exhaust gas purification device 100 may use any known type of heat exchange device.

According to the present disclosure, the first stage cooling unit 110, the second stage cooling unit 120, and the filtering unit 130 of the exhaust gas purification device 100 may be integrated, so that the whole exhaust gas purification device 100 forms a box-type exhaust gas purification device to facilitate use with the reflow oven.

Figure 2:
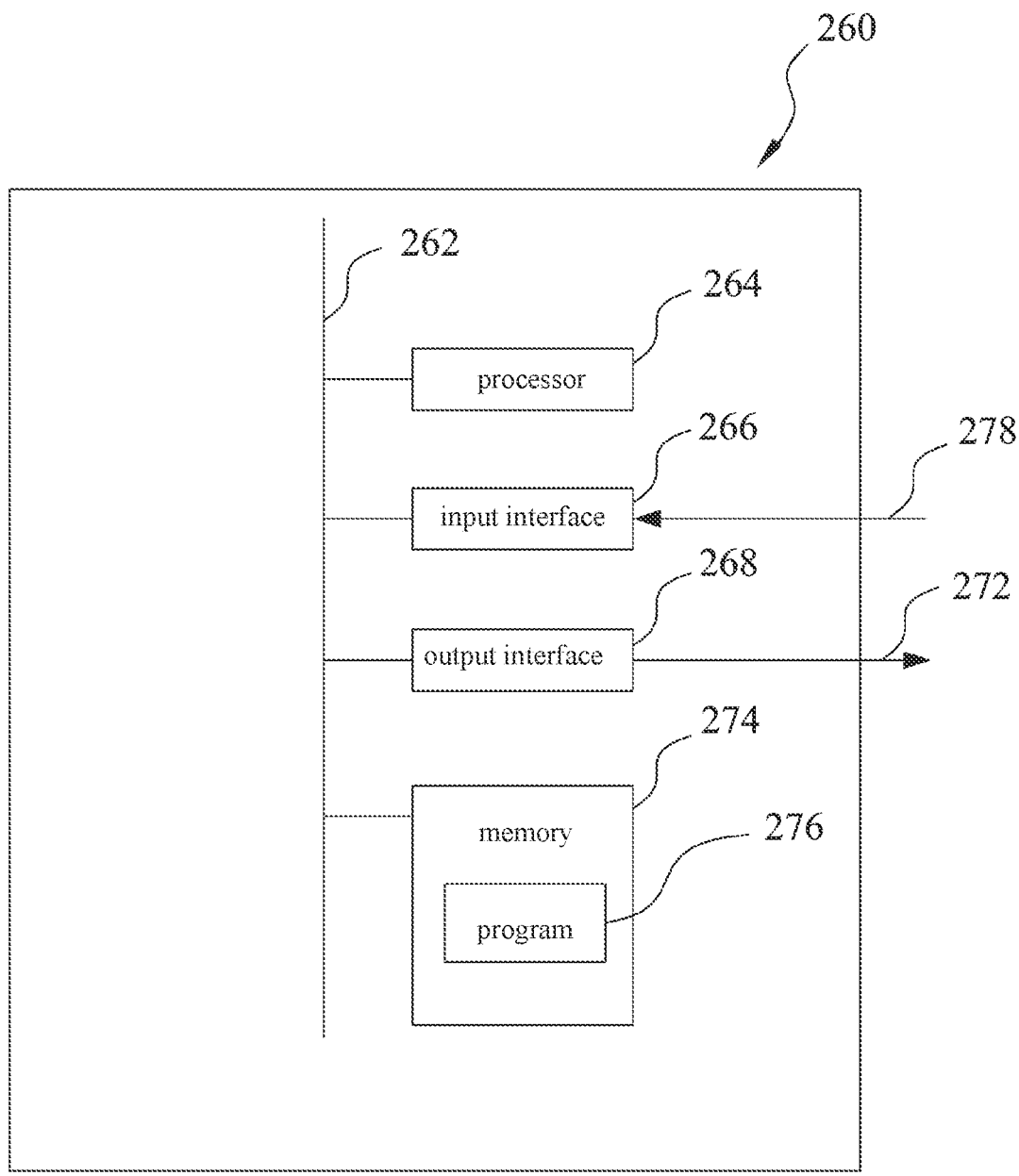
FIG. 2 is a structural diagram of a control device of the exhaust gas purification device in FIG. 1A.

FIG. 2 shows a structural diagram of a control device 260 of the exhaust gas purification device 100. The control device 260 comprises a bus 262, a processor 264, an input interface 266, an output interface 268, and a memory 274 with control programs 276. The processor 264, the input interface 266, the output interface 268, and the memory 274 are communicatively connected via the bus 262, such that the processor 264 can control the operations of the input interface 266, the output interface 268, and the memory 274. The memory 274 is used to store programs, instructions, and data. The processor 264 reads programs, instructions, and data from the memory 274, and can write data to the memory 274.

The input interface 266 receives signals and data through a connection 278, such as temperature signals detected by the temperature detection components 151, 152, 161, oxygen concentration signals detected by the oxygen concentration detection component 155, and various manually input parameters and control commands. The output interface 268 sends signals and data through a connection 272, such as control signals for controlling the closing and opening of the various valve components 117.1, 117.2, 117.3, 117.4 and 182 and the passage switching component 117.5, and control signals for controlling the heating temperature of the heating component 133. The memory 274 stores control programs, data, and the like. Various parameters may be preset in the process of production and manufacturing, or may be set by manual input or data import when in use. The processor 264 obtains various signals, data, programs, and instructions from the input interface 266 and the memory 274, performs corresponding processing on them, and outputs them through the output interface 268.

Although the present disclosure is described with reference to the specific embodiments shown in the accompanying drawings, it should be understood that the exhaust gas purification device of the present disclosure can have many variations without departing from the spirit and scope of the teaching of the present disclosure. A person of ordinary skill in the art will also realize that there are different ways to alter the arrangements in the embodiments disclosed in the present disclosure, all the alterations falling within the spirit and scope of the present disclosure and the claims.

The invention claimed is:

1. An exhaust gas purification device for purifying exhaust gas in a reflow oven hearth, comprising:
   a filtering unit;
   a filtering component provided in the filtering unit;
   a controllable gas passage that controllably communicates an interior of the filtering unit with an external environment containing oxygen, the controllable gas passage being configured to controllably introduce a gas containing oxygen into the filtering unit;
   a heating component provided in the filtering unit, wherein the heating component is configured to heat the gas in the filtering unit to an oxidation temperature at which carbon in adherent substances on the filtering component can chemically react to produce a gas;
   a fluid power supplying device configured to drive gas flow in the exhaust gas purification device through the filtering unit, wherein the filtering component is located upstream of the fluid power supplying device; and
   a control device configured to selectively control the exhaust gas purification device in a self-cleaning mode by, in the self-cleaning mode, controlling the controllable gas passage to be closed and control the heating component to heat the gas in the filtering unit to the self-cleaning temperature, such that the soldering flux in the adherent substances on the filtering component is physically changed into a liquid or a gas, and carbon is generated in the adherent substances.

2. The exhaust gas purification device according to claim 1, wherein:
   the exhaust gas purification device comprises an exhaust gas inlet and a purified gas outlet, an upstream side of the filtering component is in fluid communication with the exhaust gas inlet, and a downstream side of the filtering component is in communication with the purified gas outlet and the fluid power supplying device; and
   the heating component is disposed on the upstream side of the filtering component.

3. The exhaust gas purification device according to claim 2, wherein:
   the heating component is further configured to heat the gas in the filtering unit to a self-cleaning temperature at which soldering flux in the adherent substances on the filtering component can physically change into a liquid or a gas.

4. The exhaust gas purification device according to claim 3, wherein the control device is further configured to selectively control the exhaust gas purification device in a maintenance mode, wherein
   the control device is configured to, in the maintenance mode, control the controllable gas passage to be opened and control the heating component to heat the gas in the filtering unit to the oxidation temperature, such that the carbon in the adherent substances on the filtering component chemically react to produce a gas.

5. The exhaust gas purification device according to claim 4, wherein the control device is configured to selectively control the exhaust gas purification device in an exhaust gas purification mode, wherein
   the control device is configured to, in the exhaust gas purification mode, control the controllable gas passage to be closed such that the exhaust gas in the reflow oven hearth is filtered by the filtering component, and during the filtering, adherent substances including soldering flux are deposit on the filtering component.

6. The exhaust gas purification device according to claim 5, wherein:
   the controllable gas passage is configured such that an outlet of the controllable gas passage is close to the filtering component.

7. The exhaust gas purification device according to claim 1, wherein the control device is configured to control a heating temperature of the heating component so that the heating component can heat the gas in the filtering unit to the oxidation temperature or the self-cleaning temperature.

8. The exhaust gas purification device according to claim 4, wherein the oxidation temperature is higher than the self-cleaning temperature.

9. The exhaust gas purification device according to claim 8, wherein the oxidation temperature is 400~450° C.

10. The exhaust gas purification device according to claim 8, wherein the self-cleaning temperature is 150~170° C.

11. The exhaust gas purification device according to claim 1 wherein, at the oxidation temperature, a portion of an organic matter in adherent substances on the filtering component can also chemically react to produce a gas.

12. The exhaust gas purification device according to claim 1, wherein the fluid power supplying device comprises a fan, an air blower, or a pump.

13. The exhaust gas purification device according to claim 1, further comprising a cooling unit configured to cool exhaust gas received via an exhaust gas inlet of the cooling unit, and supply cooled exhaust gas to the filtering unit.

14. The exhaust gas purification device according to claim 1, wherein the filtering unit further comprises a waste liquid outlet configured to direct waste liquid from the filtering component to a collecting unit.

15. An exhaust gas purification device for purifying exhaust gas in a reflow oven hearth, comprising:
   a filtering unit;
   a filtering component provided in the filtering unit;
   a controllable gas passage that controllably communicates an interior of the filtering unit with an external environment containing oxygen, the controllable gas passage being configured to controllably introduce a gas containing oxygen into the filtering unit;
   a heating component provided in the filtering unit, wherein the heating component is configured to heat the gas in the filtering unit to an oxidation temperature at which carbon in adherent substances on the filtering component can chemically react to produce a gas;
   a fluid power supplying device configured to drive gas flow in the exhaust gas purification device through the filtering unit; and
   a control device configured to selectively control the exhaust gas purification device in a self-cleaning mode by, in the self-cleaning mode, controlling the controllable gas passage to be closed and control the heating component to heat the gas in the filtering unit to the self-cleaning temperature, such that the soldering flux in the adherent substances on the filtering component is physically changed into a liquid or a gas, and carbon is generated in the adherent substances.

16. The exhaust gas purification device according to claim 15, wherein:
   the exhaust gas purification device comprises an exhaust gas inlet and a purified gas outlet, an upstream side of the filtering component is in fluid communication with the exhaust gas inlet, and a downstream side of the filtering component is in communication with the purified gas outlet and the fluid power supplying device; and the heating component is disposed on the upstream side of the filtering component.

17. The exhaust gas purification device according to claim 16, wherein:

the heating component is further configured to heat the gas in the filtering unit to a self-cleaning temperature at which soldering flux in the adherent substances on the filtering component can physically change into a liquid or a gas.

18. The exhaust gas purification device according to claim 17, wherein the control device is further configured to selectively control the exhaust gas purification device in a maintenance mode, wherein the control device is configured to, in the maintenance mode, control the controllable gas passage to be opened and control the heating component to heat the gas in the filtering unit to the oxidation temperature, such that the carbon in the adherent substances on the filtering component chemically react to produce a gas.

19. The exhaust gas purification device according to claim 18, wherein the control device is configured to selectively control the exhaust gas purification device in an exhaust gas purification mode, wherein the control device is configured to, in the exhaust gas purification mode, control the controllable gas passage to be closed such that the exhaust gas in the reflow oven hearth is filtered by the filtering component, and during the filtering, adherent substances including soldering flux are deposit on the filtering component.

* * * * *